(12) United States Patent
Kamm et al.

(10) Patent No.: US 7,632,207 B2
(45) Date of Patent: Dec. 15, 2009

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 432 days.

(21) Appl. No.: 11/732,257

(22) Filed: Apr. 3, 2007

(65) Prior Publication Data
US 2007/0238573 A1 Oct. 11, 2007

(30) Foreign Application Priority Data
Apr. 6, 2006 (DE) .................. 10 2006 016 192

(51) Int. Cl.
*F16H 3/62* (2006.01)
(52) U.S. Cl. ...................................... 475/278
(58) Field of Classification Search .................. None
See application file for complete search history.

(56) References Cited

U.S. PATENT DOCUMENTS

| | | | |
|---|---|---|---|
| 6,176,803 B1 | 1/2001 | Meyer et al. | |
| 6,634,980 B1 | 10/2003 | Ziemer | |
| 6,960,149 B2 | 11/2005 | Ziemer | |
| 7,014,589 B2 | 3/2006 | Stevenson | |
| 7,018,319 B2 | 3/2006 | Ziemer | |
| 7,497,802 B2* | 3/2009 | Kamm et al. | 475/282 |
| 7,527,576 B2* | 5/2009 | Kamm et al. | 475/284 |
| 7,582,040 B2* | 9/2009 | Kamm et al. | 475/282 |
| 2008/0182705 A1* | 7/2008 | Hart et al. | 475/269 |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 101 15 983 | 10/2002 |
| DE | 101 15 995 | 10/2002 |
| DE | 10 2004 029 952 A1 | 1/2005 |
| DE | 10 2005 002 337 | 8/2006 |
| DE | 10 2005 032 001 A1 | 2/2007 |

* cited by examiner

*Primary Examiner*—Dirk Wright
(74) *Attorney, Agent, or Firm*—Davis & Bujold, P.L.L.C.

(57) ABSTRACT

The multi-speed transmission having rotatable shafts, planetary gearsets (RS1, RS2, RS3, RS4) and shifting elements (A, B, C, D, E). Carrier (ST4) of gearset (RS4) and the input shaft couple as shaft (1). Carriers (ST2, ST3) of respective gearsets (RS2, RS3) and the output shaft (AB) couple as shaft (2). Sun gears (SO1, SO4) of gearsets (RS1, RS4) couple as shaft (3). Carrier (ST1) of gearset (RS1) forms shaft (4). Sun gear (SO3) forms shaft (5). Ring gears (HO1, HO3) of gearsets (RS1, RS3) couple as shaft (6). Sun and ring gears (SO2, HO4) respectively of gearsets (RS2, RS4) couple as shaft (7). Ring gear (HO2) is shaft (8). In the flow of power, elements (A, B) are respectively between shafts (3, 4) and a transmission housing; element © is between shafts (1, 5); element (D) is between shafts (5, 8); and element (E) is between shafts (5, 7).

33 Claims, 4 Drawing Sheets

| GEAR | ENGAGED SHIFTING ELEMENTS | | | | | RATIO $\lambda$ | STEP $\varphi$ |
|---|---|---|---|---|---|---|---|
| | BRAKE | | CLUTCH | | | | |
| | A | B | C | D | E | | |
| 1 | ● | ● | ● | | | 4.70 | |
| 2 | ● | ● | | | ● | 3.13 | 1.50 |
| 3 | | ● | ● | | ● | 2.10 | 1.49 |
| 4 | | ● | | ● | ● | 1.67 | 1.26 |
| 5 | | ● | ● | ● | | 1.27 | 1.31 |
| 6 | | | ● | ● | ● | 1.00 | 1.27 |
| 7 | ● | | ● | ● | | 0.85 | 1.18 |
| 8 | ● | | | ● | ● | 0.67 | 1.27 |
| R | ● | ● | | ● | | -3.77 | TOTAL 7.05 |

Fig. 2

MULTI-SPEED TRANSMISSION

This application claims priority from German patent application serial no. 10 2006 016 192.0 filed Apr. 6, 2006.

FIELD OF THE INVENTION

The present invention concerns a multi-speed transmission, employing planetary gearsets, in particular, an automatic transmission for a motor vehicle, encompassing an input drive shaft, an output drive shaft, four planetary gearsets, at least eight rotatable shafts, as well as five shifting elements, the selective engagement of which determines different ratio relationships between the input drive shaft and the output drive shaft, so that eight forward gears and one reverse gear are possible.

BACKGROUND OF THE INVENTION

Automatic transmissions, especially for motor vehicles, include, in accord with the state of the technology, planetary gearsets, which are shifted by means of friction elements or shifting elements, such as shifting clutches and brakes and which are normally connected to a start-up element, that is subjected to slip effect and optionally has a converter lock-up clutch, for example a hydrodynamic torque converter or a fluid clutch.

Within the general framework of DE 101 15 983 A1, the applicant, for instance, has described a multi-speed transmission having an input drive shaft, which is connected to an input side planetary gearset, and an output drive shaft, which is connected to an output side planetary gearset. The described multi-speed transmission also has a maximum of seven shifting elements, by means of the selective shifting thereof, seven forward gears can be shifted, without range-shifting. The input side planetary gearset is constructed as a shiftable or a non-shiftable planetary gearset, or alternately, as a maximum of two non-shiftable, mutually coupled planetary gearsets. The output side planetary gearset is designed as a two carrier, four shaft transmission with two shiftable planetary gearsets and four free shafts. The first free shaft of this two carrier, four shaft transmission is bound to the first shifting element, the second free shaft connects with the second and third shifting element, the third free shaft is connected to the fourth and fifth shifting elements and the fourth free shaft is bound with the output drive shaft. In the case of a multi-speed transmission, with six shifting elements, in accord with the invention, it is proposed that the third free shaft or the first free shaft of the output sided planetary gearset should be bound additionally to a sixth shifting element. With a multi-speed transmission having a total of seven shifting elements, in accord with the invention it is proposed, that the third free shaft be connected to sixth shifting element and the first free shaft additionally be connected to a seventh shifting element.

A plurality of other multi-speed transmissions are, for example, also disclosed from in DE 101 15 995 A of the applicant, wherein four shiftable, mutually coupled planetary gearsets and six or seven friction-based shifting elements are provided, by the selective engagement thereof, a speed of rotation of an input drive shaft of the transmission is transferred to an output drive shaft of the transmission, and further nine or eleven forward gears may be implemented and at least one reverse gear stage can be shifted into. Consulting the transmission scheme, it is seen, that in each gear, two or three shifting elements are engaged, whereby, by means of a change from one gear to the next higher or lower gear range shifting is avoided, respectively, by disengaging only one engaged shifting element and retaining in place the previously disengaged shifting element.

Additionally, in the conventionally related, but not yet published patent application, DE 102005002337.1 of the applicant, a multi-speed transmission is proposed. The transmission possesses an input drive shaft, an output drive shaft, four mutually coupled individual planetary gearsets along with five shifting elements, whereby, eight forward gears are implemented without range shifting such, that when changing from one forward gear to the immediately next successive higher or lower forward gear, respectively, only one of the previously engaged shifting elements is disengaged and only one of the previously disengaged shifting elements is engaged. The multi-speed transmission also possesses a reverse gear. In all forward gear and in the single reverse gear, respectively, three shifting elements are engaged.

Considering the kinematic coupling of the four planetary gearsets among each other and the two shafts, namely, for input and output, provision is made, that a carrier of the fourth planetary gearset and the input drive shaft are bound together and form a first shaft of the transmission; a carrier of the third planetary gearset and the output drive shaft are bound together and form a second shaft of the transmission; a sun gear of the first planetary gearset and a sun gear of the fourth planetary gear are connected together to form a third shaft of the transmission; a ring gear of the first planetary gearset forms a fourth shaft of the transmission; a ring gear of the second planetary gearset and a sun gear of the third planetary gearset are bound together and form a fifth shaft of the transmission; a carrier of the first planetary gearset and a ring gear of the third planetary gearset are bound together and form a sixth shift of the transmission; a sun gear of the second planetary gearset and a ring gear of the fourth planetary gearset are bound together and form a seventh shaft of the transmission; and a carrier of the second planetary gearset forms an eighth shaft of the transmission.

Further, considering the kinematic coupling of the fifth shifting element with the four planetary gearsets and on the input and output drive shafts, it is provided that placements are made so that, in the direction of the flow of power, the first shifting element is between the third shaft and the transmission housing; the second shifting element is between the fourth shaft and the transmission housing; the third shifting element is between the first and fifth shafts; the fourth shifting element is either between the eighth and second shafts, or between the eighth and sixth shafts, and the fifth shifting element is either between the seventh and fifth shafts or between the fifth and eighth shafts.

Automatically shiftable vehicle transmissions, which are based on planetary gearsets, have, in general, been described many times in the state of the technology and form the foundation of on-going development and improvement thereof. These transmissions should possess a sufficient number of forward gears along with the usual single reverse gear and provide a very well adapted ratio selection with an advantageous spread. Further, these transmissions enable high acceleration ratios in the forward direction and are suitable for installation both in passenger cars as well as in commercial vehicles. Beyond this, these transmissions should require a relatively small investment of money and labor for assembly, and relatively small number of shifting elements. They should further avoid sequential shifting arrangements requiring double clutching. The result being that when shifting in defined gear-groups, only one shifting element need be operated.

SUMMARY OF THE INVENTION

The present invention proposes a multi-speed transmission of the type described in the introductory passages, with at least eight shiftable forward gears and at least one reverse gear that avoids range shifting while implementing a total of four planetary gearsets, using the least possible number of shifting elements. Additionally, the proposed transmission has a large ratio-spread with a comparatively harmonic gear succession and, at least in the principal driving gears, also possess a favorable degree of efficiency and, comparatively, little slippage and tooth wear.

The invented multi-speed transmission, in accord with the invention, is based on planetary gearset construction, originating from the transmission scheme of the generic patent application DE 102005002337.1 of the applicant, which possesses an input drive shaft, an output drive shaft, four mutually coupled planetary gearsets, at least eight rotatable shafts as well as five shifting elements (including two brakes and three clutches), the selective usage of which activate changeable ratios between the input drive shaft and the output drive shaft, so that eight forward gears and one reverse gear can be realized. In each gear, for example, three of the five shifting elements are engaged, whereby, in a change from one forward gear into the next successive higher or lower forward gear, only one of the previously engaged shifting elements is opened and only one of the previously disengaged shifting elements is engaged.

In accord with the invention, provision is made to the effect that a carrier of the fourth planetary gearset and the input drive shaft are continually bound together and form the first shaft of the transmission; a carrier of the second planetary gearset, a carrier of the third planetary gearset and the input drive shaft are continually bound to one another and form the second shaft of the transmission; a sun gear of the first planetary gearset and a sun gear of the fourth planetary gearset are continually bound together and form the third shaft of the transmission; a carrier of the first planetary gearset forms the fourth shaft of the transmission; a sun gear of the third planetary gearset forms the fifth shaft of the transmission; a ring gear of the first planetary gearset and a ring gear of the third planetary gearset are mutually bound and form the sixth shaft of the transmission; a sun gear of the second planetary gearset and a ring gear of the fourth planetary gearset are bound together and form the seventh shaft of the transmission; a ring gear of the second planetary gearset forms the eighth shaft of the transmission. The first shifting element in the flow of power is placed between the third shift and the transmission housing; the second shifting element in the flow of power is placed between the fourth shaft and the transmission housing; the third shifting element in the flow of power is placed between the first and the fifth shafts of the transmission; the fourth shifting element in the flow of power is placed between the fifth and the eighth shafts of the transmission; and the fifth shifting element in the flow of power is placed between the fifth and the seventh shaft of the transmission.

The invented multi-speed transmission differs from the generic multi-speed transmission of DE 102005002337.1 to the extent that the second shaft of the transmission is now continually bound to the carrier of the second planetary gearset; the fourth shaft of the transmission is now formed by the carrier of the first planetary gearset; the fifth shaft of the transmission is now formed by the sun gear of the third planetary gearset; the sixth shaft of the transmission is now formed by the ring gear of the first planetary gearset and the ring gear of the third planetary gearset; the ring gear of the second planetary gearset forms the eighth shaft of the transmission, and the fourth shifting element in the flow of power is placed between the fifth and the eighth shaft of the transmission.

The inventive multi-speed transmission further differs the multi-speed transmission as disclosed by DE 102005002337.1, such that the first forward gear is achieved by the engagement of the first, second, third shifting elements, the second forward gear is achieved by the engagement of the first, second and fifth shifting elements, the third forward gear is achieved by the engagement of the second, third, and fifth shifting elements, the fourth forward gear stage is achieved by the engagement of the second, fourth and fifth shifting elements, the fifth forward gear is achieved by the engagement of the second, third and fourth shifting elements, the sixth forward gear is achieved by the engagement of the third, fourth and fifth shifting elements, the seventh forward gear is achieved by the engagement of the first, third and fourth shifting elements, the eighth forward gear is achieved by the engagement of the first, fourth and fifth shifting elements and the reverse gear is achieved by the engagement of the first, second and fourth shifting elements.

Three of the four planetary gearsets are designed as a so-called negative planetary gearset, the planet gears of which mesh with the sun gear and ring gear of the given planetary gearset. One of the four planetary gearsets—namely the first planetary gearset—is designed as the so-called positive planetary gearset with inner and outer planet gearsets, which mesh together, whereby the inner planet gearset also meshes with the sun gear of this positive planetary gearset, and the outer planet gearset also meshes with the ring gear of this positive planetary gearset. Giving consideration to the spatial arrangement of the four planetary gearsets within the housing of the transmission, with regard to an advantageous embodiment, it is proposed, to place the four planetary gearsets coaxially aligned in a successive row, and be designated as the "first, second, third and fourth planetary gearsets".

The spatial arrangement of the shifting elements of the invented multi-speed transmission within the transmission housing is, principally, restricted only by the inside dimensions and the outer shape of the housing. A number of spacial and the constructive arrangements of the shifting elements, for example, can be learned from DE 102005002337.1.

Thus, for example, provision may be made in a variant, which is advantageous for a standard drive, that the first and the second shifting elements, seen with space savings in mind, can be placed in an area radially located about the first or the fourth planetary gearset, and that the third and fifth shifting elements, again when spatially considered, can be located at least partially axially placed between fourth and the second planetary gearsets, and that the fourth shifting element can find a position axially located between the second and third planetary gearsets.

As a design, which is favorably accepted, it is possible that a common disk carrier can be provided for the third and the fifth shifting element. Again spatially considered, the third and the fifth shifting elements can be at least placed beside one another or at least partially be set one above the other. Again, with space requirements in mind, it is possible that the first and the second shifting elements can be at least partially beside each other or at least partially radially placed above one another.

By means of the invented design, where passenger cars are concerned, the multi-speed transmission, offers appropriate ratios which have a large spread in a harmonic succession of gears. Moreover, in the case of the invented multi-speed transmission, by means of a small number of shifting elements, namely two brakes and three clutches, the expenditures for such an assembly are comparatively low.

Additionally, a satisfactory efficiency is attained in all gears, due to the small loss in slippage, since, first, in each gear respectively, only two shifting elements are disengaged and second, as a result of low toothing losses in the individual planetary gearsets, these can be built with great simplicity.

Further, it is advantageously possible, with the invented multi-speed transmission, to carry out a start-up with a hydrodynamic converter, or with an external starting clutch or even with other outside start-up elements. Initiating drive can be executed with a start-up element integrated into the transmission. One of the two brakes is adaptable thereto, which can be activated in the first, second and reverse travel directions. In addition, the multi-speed transmission, in accord with the invention, is so designed, that it possesses an ability for adjusting the drive string arrangements both with regard to the direction of power paths as well as when considering allowable installation requirements. Accordingly, it becomes possible, without particularly new design measures, to have the input and output drive shafts of the transmission arranged coaxially or axis-parallel to one another.

To allow the input and output drives to act coaxially to one another, it is particularly advantageous, if the first planetary gearset is that planetary gearset of the invented planetary gearset group, proximal to the input drive of the transmission. In accord with the spatial requirements of the five shifting elements within the transmission housing, provision can be made, in this regard, that each four planetary gearsets, in an advantageous way, be axially centrally penetrated by at least one shaft of the transmission. Consequently, in connection with a shifting element arrangement, where the four planetary gearsets are coaxially aligned in the sequential order of, "first, fourth, second, third planetary gearset". This being an arrangement wherein the first and the second shifting elements are placed proximal to the drive side in the area which is located radially above the first or fourth planetary gearset, the third and the fifth shifting elements are placed at least partially in an axially aligned area between the fourth and second planetary gearset, and the fourth shifting element is to be found at least partially in an area, axially aligned, between the second and the third planetary gearsets. Further, to continue this arrangement, the first and fourth planetary gearsets are centrally penetrated only by the first shaft of the transmission in an axial direction, while the second planetary gearset is only centrally penetrated only by the fifth shaft of the transmission in an axial direction and the third planetary gearset is not penetrated by any shaft of the transmission The designed formation of the pressure and lubrication feed to the servo-apparatuses of the individual shifting elements is made to be correspondingly simple.

With an application having the input and output drive shafts running axis parallel or angularly to one another, the first or the third planetary gearset can be placed on the side of the transmission housing, proximal to the input drive shaft which is operationally bound to the drive motor of the transmission. If the first planetary gearset is proximal to the input drive of the transmission, then, provision can be made—as was done with the coaxial arrangement of the input/output drive shafts—giving consideration to the space requirements within the transmission housing of the five shifting elements, that each of the four planetary gearsets be respectively centrally penetrated by one shaft of the transmission in the axial direction, i.e., that the first and the fourth planetary gearset be penetrated only by the first shaft of the transmission and the second planetary gearset be only penetrated by the fifth shaft of the transmission.

Conversely to the above, the input and output drive shafts are not aligned coaxially to one another and the third planetary gearset is proximal to the input drive of the transmission, the first and the fourth planetary gearset are not penetrated by any shaft of the transmission in the axial direction. For example, referring to the above mentioned arrangement of shifting elements, the third and the fifth shifting element are placed axially between the second and the fourth planetary gearsets and the fourth shifting element is to be found axially located between the second and the third planetary gearsets, the second planetary gearset is centrally penetrated in the axial direction both by the fifth shaft of the transmission, as well as by the first shaft of the transmission, which runs sectionally centrally within this fifth shaft, while the third planetary gearset is centrally penetrated in the axial direction only by the first shaft.

In all cases, it is possible that the third shaft of the transmission, is formed by the sun gears of the first and fourth planetary gearsets, and can also be rotateably affixed to the hub of a transmission housing. If the first planetary gearset is proximal to the input drive of the transmission, then, this housing affixed hub is a component of the input drive sided transmission housing wall, or otherwise, a component of that transmission housing wall, which lies opposite to the drive motor.

BRIEF DESCRIPTION OF THE DRAWINGS

In the following, with the aid of the attached drawings, the invention will be explained and described in greater detail. The same, or essentially comparable components are, in the following, also designated with the same reference numbers. There is shown in:

FIG. 2 which is an exemplary shifting diagram for the multi-speed transmission of FIG. 1;

DETAILED DESCRIPTION OF THE PREFERRED EMBODIMENTS

Figure 1:
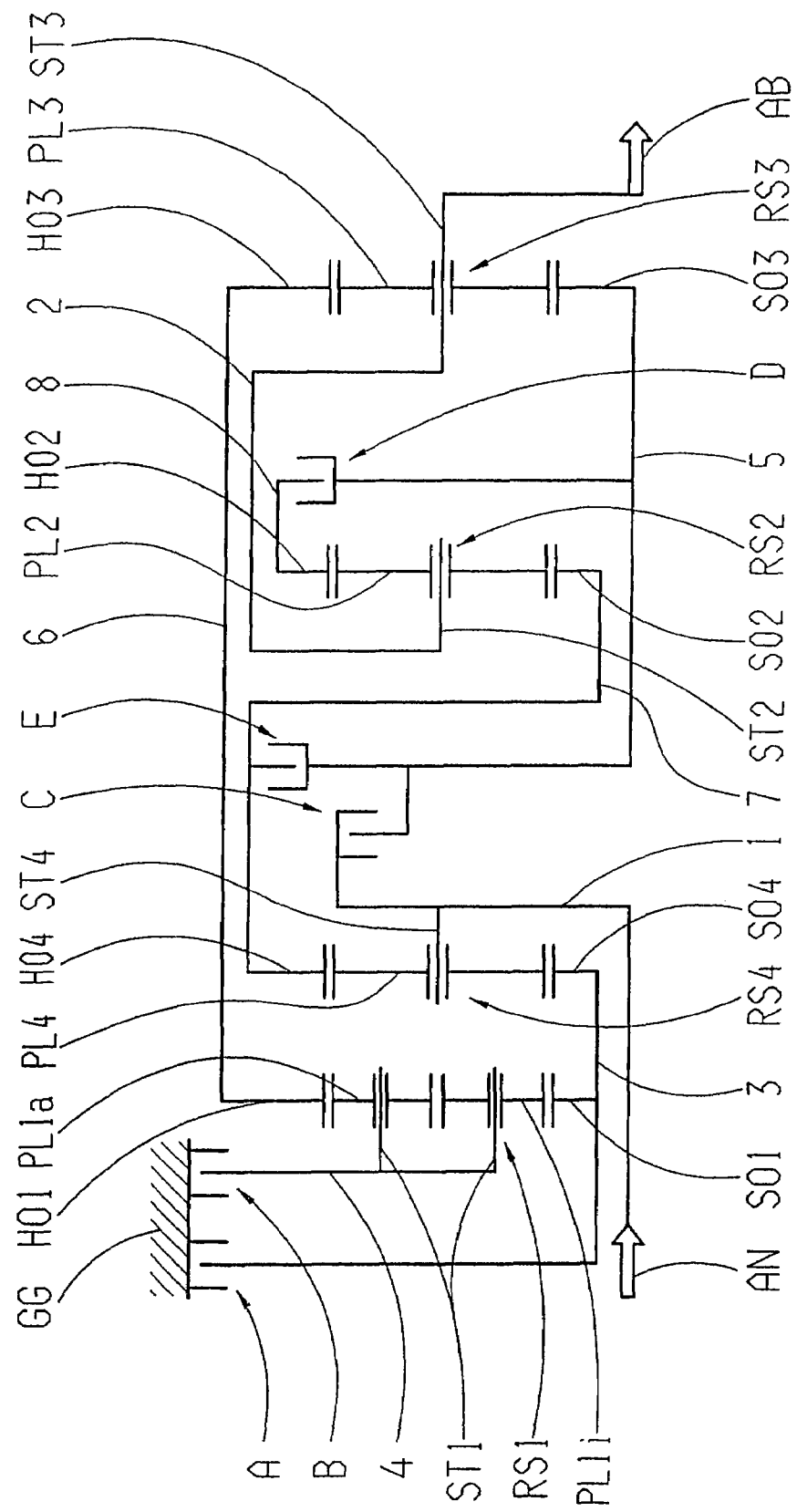
FIG. 1 which is a schematic illustration of an embodiment of a multi-speed transmission in accord with the invention.

FIG. 1 shows an embodiment of an inventive multi-speed transmission in a schematic presentation. The transmission includes an input drive shaft AN and an output drive shaft AB, as well as four planetary gearsets namely RS1, RS2, RS3, RS4 and five shifting elements A, B. C. D, E, which are all contained in a transmission housing GG. The four planetary gearsets RS1, RS2, RS3, RS4 are shown, in this embodiment in the order "RS1, RS4, RS2, RS3" and are placed coaxially and successively to one another. The planetary gearsets RS2, RS3 and RS4 are designed as simple negative planetary gearsets. A negative planetary gearset possesses, as is known, planet gears, which engage the sun gear and ring gear of that planetary gearset. The ring gears of planetary gearsets RS2, RS3, RS4 are correspondingly designated with HO2, HO3 and HO4, the sun gears are shown as SO2, SO3 and SO4, while the planet gears are designated by PL2, PL3 and PL4, finally, the carriers, on which these planet gears are rotatably mounted, have the reference numbers ST2, SDT3 and ST4.

The planetary gearset RS1 is designed as a simple positive planetary gearset, constructed in a double planetary manner. A positive planetary gearset possesses, as is known, inner and outer planet gears, which mesh with one another, wherein the inner planet gears also mesh with the sun gear of the same planetary gearset and the outer planet gears also mesh with the ring gear of the planetary gearset. The ring gear of the planetary gearset RS1 is designates as HO1, the sun gear as SO1, and the inner planet gear as PL1$i$, the outer planet gears being PL1$a$, the carrier, on which the inner and outer planet gears PL1$i$, PL1$a$ are rotatably affixed, is designated as ST1. The shifting elements A and B are designed as brakes, which, in the embodiment here presented, act as frictional, shiftable disk brakes, obviously however, in another embodiment, these also can be frictional shiftable band brakes or, for example, they may also be made as shape-fit, shiftable, gripping or cone type brakes. The shifting elements C, D, and E are designed as clutches, which in the presented embodiment, are shown as friction based, shiftable disk clutches, obviously, in other applications, these can as well be shape-fit, shiftable gripping or cone type brakes. With these five shifting elements A to E, a selective shifting for eight forward gears and at least one reverse gear can be realized. The inventive multi-speed transmission possesses, as a whole, at least eight rotatable shafts, which are designated with the reference numbers 1 to 8.

In regard to the kinematic coupling of the individual elements of the four planetary gearsets RS1, RS2, RS3, RS4 with one another and with the input and output drives AN, AB, the following is provided. The carrier ST4 of the fourth planetary gearset RS4 and the input drive shaft AN are continually bound to one another and form shaft 1. The carriers ST2 and ST3 of the second and third planetary gearsets RS2 and RS3 are continually bound to one another and form shaft 2. The sun gears SO1, SO4 of the first and fourth planetary gearsets RS1, RS4 are continually bound to one another and form shaft 3. The coupled carrier ST1 of the first planetary gearset RS1 forms the shaft 4. The sun gear SO3 of the third planetary gearset RS3 forms the shaft 5. The ring gear HO1 of the first planetary gearset RS1 and the ring gear HO3 of the third planetary gearset RS3 are continually bound to one another and form shaft 6. The ring gear HO4 of the fourth planetary gearset RS4 and the sun gear of the second planetary gearset RS2 are continually bound to one another and form shaft 7. The ring gear HO2 of the second planetary gearset RS2 form the shaft 8.

In regard to the kinematic coupling of the five shifting elements A to E, to the so-described shafts 1 to 8 of the transmission, in accordance with the multi-speed transmission shown in FIG. 1, the following is provided: the brake A is placed as a first shifting element in the power path between the shaft 3 and a housing GG of the transmission. The brake B is placed as a second shifting element in the power path between the shaft 4 and the housing GG of the transmission. The clutch C is placed as a third shifting element in the power flow between the shaft 1 and the shaft 5. The clutch D is placed as a fourth shifting element in the power flow between the shaft 5 and the shaft 8. The clutch E is placed as a fifth shifting element in the power flow between the shaft 5 and the shaft 7.

In the embodiment illustrated in FIG. 1, the first planetary gearset RS1 is this gearset proximal to the input drive of the transmission and the third planetary gearset RS3 is the gearset proximal to the output drive of the transmission, the input drive shaft AN and the output drive shaft AB are, for example, coaxial to one another. To the expert, it would be immediately obvious, that this transmission, without special effort, could be so modified, that the input and output drive shafts need not be coaxial to one another, but rather axis-parallel or angularly disposed with respect one to the other. In the case of an arrangement of this kind, the expert, upon need, can also place the input drive of the transmission proximally to the third planetary gearset RS3, as well as on that side of the third planetary gearset RS3, which is remote from the first planetary gearset RS1.

Principally, it is possible that the installation space requirements of the shifting elements of the embodiment of a multi-speed transmission as shown in FIG. 1 could optionally be accommodated in the interior of the transmission and would only be limited by means of the external shaping of the transmission housing GG.

In the embodiment example presented in FIG. 1, the two brakes A and B, with respect given to their required occupying space, are placed in the area of the first planetary gearset RS1, which is also near the input drive, and are in adjacent axial alignment. The two brakes A,B are arranged to kinematically communicate with the first planetary gearset RS1 with the brake B located closer to the first planetary gearset RS1 than brake A, and the fourth planetary gearset RS4 is adjacent the first planetary gearset RS1. That is to say, the brake A is located nearer to input drive of the transmission than brake B. From a spatial standpoint, the brake B is placed at least partially in an area radially disposed above first planetary gearset RS1 and together with the brake A, is located on that side of the first planetary gearset RS1 which side is remote from the fourth planetary gearset RS4, i.e., the side being near to the input drive.

An inner disk carrier of the brake A forms a section of the shaft 3 of the transmission and is rotationally affixed to the sun gear SO1 on that side of the first planetary gearset RS1, which is remote from the fourth planetary gearset RS4. Sectionally, the shaft 3 serves as a type of sun gear shaft, which binds together the sun gears SO1 and SO4 of the planetary gearsets RS1 and RS4. In this way, it becomes possible that the shaft 3 can be rotatably placed on the input drive shaft AN as well as on a (not shown in greater detail in FIG. 1) transmission housing affixed hub. An inner disk carrier of the brake B forms a section of the shaft 4 of the transmission and is rotationally affixed with the coupled carrier ST1 of the first planetary gearset RS1. The servo-apparatuses necessary for activation of frictional elements of the two brakes A and B are shown in an elementary manner in FIG. 1 for the sake of simplicity, and can, for example, be axially slidably installed in the transmission housing GG or integrated within a transmission housing affixed housing cover.

The expert can easily modify these exemplary, space connected, arrangements of the two brakes A and B. The brake A, for example, could also be at least partially placed radially over the first planetary gearset RS1 and the brake B can be installed at least partially radially above the fourth planetary gearset RS4. In still another embodiment of the present invention, it is possible that the two brakes A and B, for example, can be radially superimposed, one above the other, bordering on the first planetary gearset RS1 and on that side, which is remote from the fourth planetary gearset RS4. If this is done, then the brake B is placed at a greater diameter than is the brake A.

As may be further seen in FIG. 1, at least the disk set for the clutches C and E, seen with regard to the space occupied, are placed in an area located axially between the fourth and the second planetary gearsets RS4, RS2, while at least the disk set of the clutch D, again spatially observed, is located axially in an area between second and third planetary gearsets RS2, RS3. The servo-apparatuses necessary for the activation of these disk sets of the three clutches C, D and E are indicated in FIG. 1, but, for the sake of clarity, are not shown in detail.

The clutch C axially borders the fourth planetary gearset RS4 directly. Accordingly, an outside disk carrier of the clutch C is rotationally affixed to the carrier ST4 on that side of the disk set of the clutch C, which is proximal to the fourth planetary gearset RS4, and is, in like manner, attached to input drive shaft AN. On this account, it is possible that the clutch C can be designated as a section of the shaft 1 of the transmission. An inside disk carrier of the clutch C is rotationally affixed to the sun gear SO3 of the third planetary gearset RS3 and consequently can be regarded as a section of the shaft 5 of the transmission. The servo-apparatuses necessary for activating the disk sets of the clutch C can, for example, be axially and slidably placed within the cylindrical space, which is created by outside disk carrier of the clutch C. The servo-apparatuses can then rotate continually at the speed of rotation of the shaft 1, i.e., of the input drive shaft AN. For the compensation of the rotating pressure, it is possible that the clutch C, in a known manner, can be provided with a dynamic pressure compensation means.

As we are taught further in FIG. 1, the disk set of the clutch E, spatially considered, is adjacent to the second planetary gearset SR2. Obviously, the disk set of the clutch E, spatially observed, can also be placed radially above the the disk set of the clutch C. An inside disk carrier of the of the clutch E—similar to the inside disk carrier of the clutch C—is rotationally affixed to the sun gear SO3 of the third planetary gearset RS3 and is enabled, on this account, to also be designated as a section of the shaft 5 of the transmission. In this way, in an advantageous technical manufacturing manner, a mutually used disk carrier can be supplied for the clutches C and E. An outside disk carrier for the clutch E is rotationally affixed with the ring gear HO4 of the fourth planetary gearset RS4 and consequently forms a section of the shaft 7 of the transmission. The servo-apparatus necessary for activating the disk set of the clutch E can be axially and slidably placed on the inner disk carrier of the clutch E and then can rotate continually at the speed of rotation of the shaft 5. This, however, can also be slidably placed on the outside disk carrier of the clutch E and would then continually rotate at the rotational speed of the shaft 7. Obviously, it is possible that the clutch E can possess a dynamic pressure compensation.

Deviating now from the embodiment presented in FIG. 1, it is possible that in another embodiment of the transmission, provision can be made that the two clutches C and E are caused to form a premountable, i.e., factory made, component group. This component group would include disk sets for the clutches C and E, wherein these sets would be mounted, one over the other and would include a common disk carrier serving for the activation of both servo-apparatuses of the respective disk set of the clutches C and E. Further, in this case, the disk set of the clutch C would be placed beneath, radially speaking, the disk set of the clutch E. In such a case, the common disk carrier for the (radially inner) clutch C can serve the clutch E first, as an outside disk carrier and second as a (radially outer) disk carrier. In addition, the common disk carrier now holds a position as a section of the shaft 5 of the transmission and can be permanently bound to the sun gear SO3 of the third planetary gearset RS3. Both the servo-apparatuses are axially and slidably mounted on the common disk carrier.

Further information from FIG. 1 discloses, that the clutch D directly borders the second planetary gearset RS2. This arrangement allows an outer disk carrier of the clutch D to be rotationally affixed to the ring gear HO2 of the second planetary gearset RS2, thus forming a section of the shaft 8 of the transmission. An inner disk carrier of the clutch D forms a section of the shaft 5 of the transmission and is, first, rotationally bound to the sun gear SO3 of the third planetary gearset RS3 and, second, similarly bound with the inner disk carriers of the clutches C and E. The servo-apparatuses necessary for the activation of the disk sets of the clutch D can, for instance, be affixed in an axially, slidable manner onto the inner disk carrier of the clutch D and so rotate continually at the same rotational speed as does the shaft 5. Provision, however, can still be made, to the effect that the servo-apparatus of the clutch D can be placed inside the cylindrical space formed by outer disk carrier of the clutch D. The clutch D can be axially and slidably mounted onto this outer disk carrier, whereby it will rotate at the same rotational speed of the shaft 8. For compensation of the rotationally induced pressure of a rotating pressure chamber, this servo-apparatus can possess in a known manner, a dynamic pressure compensation means.

Corresponding to the gearset scheme, more exactly, corresponding to the sequential order of RS1, RS4, RS2, RS3 of the four planetary gearsets RS1, RS4, RS2, RS3 and in keeping with the arrangement of the three clutches C, D, and E, in a an area located axially between the fourth and the third planetary gearsets RS4, RS3, the shaft 6 completely over laps in it its course in an axial direction, the fourth planetary gearset RS4, the two clutches C and E, the second planetary gearset RS2 as well as the clutch D.

It has been expressly stated, that the above described arrangement of the three clutches C, D and E are to be regarded only as exemplary in character. Upon need, the expert could also modify these examples of spatial arrangement of the three clutches, C, D, and E. Numerous inclinations to such possible alternate arrangements are to be found in the generic patent application DE 102005002337.1. Thus, for example, without significantly changing the component structure of the transmission exhibited in FIG. 1, provision can be made that the disk set of the clutch E, with respect to space conditions, can be at least partially placed radially above the disk set of the clutch C, and at the same time, the clutch E can be located, spatially considered, at least partially radially above the clutch C.

In FIG. 2, is presented a shifting diagram of the invented multi-speed transmission in accord with FIG. 1. In each gear stage, three shifting elements are engaged, and two shifting elements are disengaged. Besides the logic of the shifting diagram, considerable value may be taken from the respective ratios i of the individual gears and the therefrom to be determined gear spread φ. The given ratios i are taken from the (typical) standard transmission ratios of the four planetary gearsets RS1, RS2, RS3, RS4, these ratios being +3.00, −1.80, −3.70 and −2.00. Further, from the shifting diagram may be learned, that the successive shifting of the double shift type, also known as range shifting, can be avoided, since two neighboring gears in the shifting logic use two shifting elements in common. The sixth shifting stage is designed as a direct gear.

The first forward gear is achieved by an engaging of the brakes A and B and the clutch C, the second forward gear attains the same end by engaging the brakes A and B and the clutch E. The third forward gear is reached by means of engaging the brake B and the clutches C and E. The fourth forward gear is obtained by engaging the brake B and the clutches D and E. The fifth forward gear stage is obtained by engaging the brake B and the clutches C and D. The sixth forward gear is obtained by engaging the clutches C, D and E, while the seventh gear stage is reached by engaging the brake A and the clutches C and D. Finally, the eighth gear stage is obtained by engaging the brake A and the clutches D and E. As may be further inferred from the shifting diagram, the reverse gear stage is obtained by the engaging of the brakes A and B and the clutch D.

In accord with the invention, initiating drive of a motor vehicle with a shifting element integrated within the transmission is entirely possible. A shifting element would be particularly well adapted for this operation, wherein advantageously the brake A or the brake B would be required in both the first forward as well as in the reverse gear. In an advantageous manner, these two brakes A and B could also be needed in the second forward gear. If the brake B is used as a startup element which is integrated in the transmission, then initiating drive is even possible in the first five forward gears and the reverse gear. As may be seen in the shifting diagram, even the clutch C can be applied for initiating drive in the forward direction and for starting up in the reverse direction, the clutch D would be used as a ring transmission startup element.

For the previously presented, that is to say, the previously described embodiments for an invented multi-speed, transmission, the following statements are valid:

In accord with the invention, the possibility exists, that even with similar transmission gear diagrams, and adhering to the given ratio of the gear stages of the individual planetary gearsets, that different gear spreads arise, so that performance variations in applications and vehicle specifications can occur.

Figure 3:
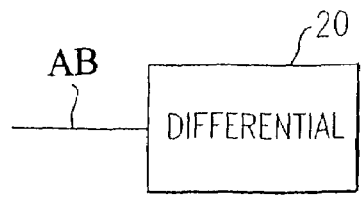
FIG. 3 is a diagrammatic view of an embodiment of the inventive multi-speed transmission having a differential.
Figure 8:
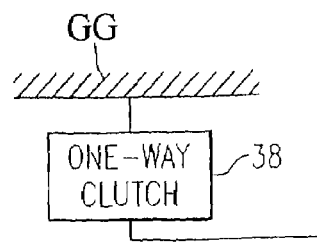
FIG. 8 is a diagrammatic view of an embodiment of the inventive multi-speed transmission having a one-way clutch.

It is also possible, as is shown in FIG. 8, to provide for each individual gear position of the multi-speed transmission, additional one-way clutches 38, for instance, between a shaft and the housing or possibly, between two shafts. It is also possible that an axle differential 20 and/or a transfer differential can be placed on the input or the output sides and shown in FIG. 3.

Figure 4:
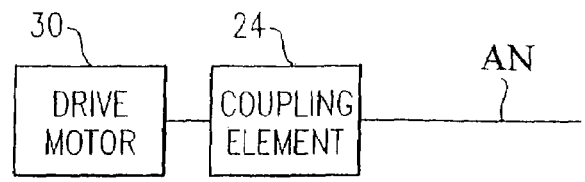
FIG. 4 is a diagrammatic view of an embodiment of the inventive multi-speed transmission with a coupling element and a drive motor.
Figure 5:
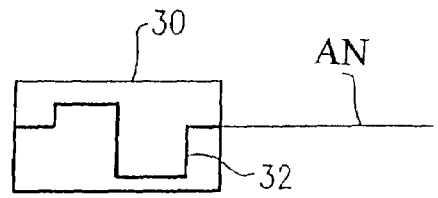
FIG. 5 is a diagrammatic view of an embodiment of the inventive multi-speed transmission with a crankshaft of the drive motor fixed to an input shaft of the multi-speed transmission.
Figure 12:
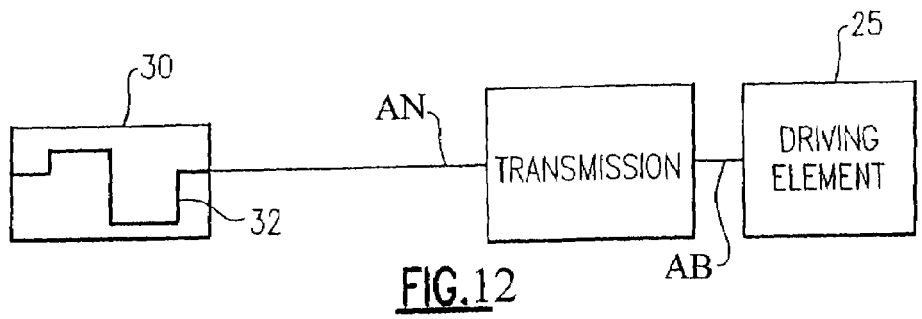
FIG. 12 is a diagrammatic view of another embodiment of the inventive multi-speed transmission with the crankshaft of the drive motor fixed to the input shaft of the multi-speed transmission and the coupling element located behind the multi-speed transmission.

Within the borders of an advantageous development, as shown in FIG. 4, it is possible that the input drive shaft AN can be separated by a coupling element 24 from a principal drive motor 30, the coupling element could be a hydrodynamic converter, a hydraulic clutch, a dry startup clutch, a wet startup clutch, a magnetic powder clutch or a centrifugal force clutch. It is also possible, as shown in FIG. 12, to place such a driving element 25 in the direction of the powerflow direction behind the transmission, whereby, in such a case, the input drive shaft AN is continually bound to the crankshaft 32 of the drive motor 30 and shown in FIG. 5.

Figure 6:
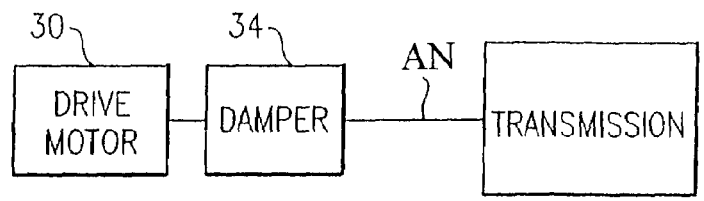
FIG. 6 is a diagrammatic view of an embodiment of the inventive multi-speed transmission having the drive motor communicating with a damper.

The invented multi-speed transmission further enables, as shown in FIG. 6, the placement of a torsional vibration 34 damper to be provided between the drive motor 30 and the transmission.

Figure 7:
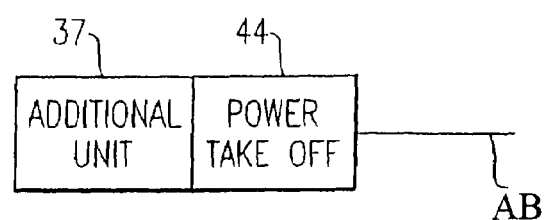
FIG. 7 is a diagrammatic view of an embodiment of the inventive multi-speed transmission with a power take-off for driving an additional unit.
Figure 10:
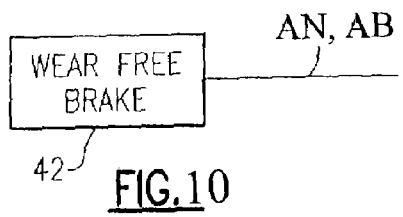
FIG. 10 is a diagrammatic view of a preferred design of the inventive multi-speed transmission having a wear free brake.
Figure 11:
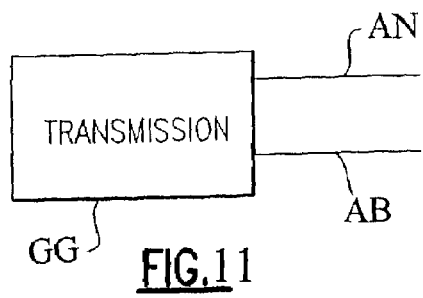
FIG. 11 is a diagrammatic view of a further embodiment of the invention with the input and the output being provided on the same side of the multi-speed transmission housing.

Within the framework of an advanced embodiment of the invention, shown in FIG. 10, it is possible to place upon each shaft, preferentially on the input drive shaft AN or on the output drive shaft AB, a wear-free brake 42, such as, for example, a hydraulic or an electrical retarder or the like, which is of particular importance especially for installation in commercial vehicles. Moreover, as shown in FIG. 7, it is possible to provide for the input drive, a power take-off 44 on each shaft, preferably on the input drive shaft AN or on the output drive shaft AB, to drive additional units 37. Additionally, as shown in FIG. 11, the input and the output are provided on the same side of the housing GG.

The installed shift elements can be designed as power shifting clutches or brakes. In particular, friction-locking clutches or friction-locking brakes, for example, multi-disk clutches or band brakes and/or conical clutches. Further, it is possible to employ as shifting elements form-fit brakes and/or form fit clutches such as, synchronizing devices or claw clutches, as the control elements.

Figure 9:
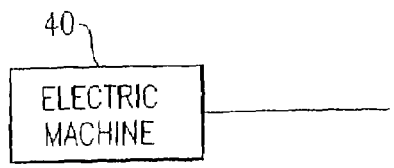
FIG. 9 is a diagrammatic view of an embodiment of the inventive multi-speed transmission with an electric machine.

An added advantage of the presented multi-speed transmission of FIG. 9 is, that on each shaft, an electrical machine 40 can be provided as a generator or as an additional drive unit.

Obviously every constructive improvement, especially any spatial arrangement of the planetary gears and the shifting elements, as individually or in combination, which prove technically advantageous, fall under the extent of the protection of the attendant claims, without affecting the function of the transmission, as this is presented in the claims, even in a case that these improved objects or functions are not explicitly presented in the drawing or in the description.

REFERENCE NUMBERS AND
CORRESPONDING COMPONENTS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third slutch
AB output drive shaft
AN input drive shaft
GG housing
RS1 first planetary gearset
HO1 ring gear of the first planetary gearset
SO1 sun gear of the first planetary gearset
ST1 Carrier of the first planetary gearset
PL1a outer planet gears of the first planetary gearset
PL1i inner planet gears of the first planetary gearset
RS2 second planetary gearset
HO2 ring gear of the second planetary gearset SO2 sun gear of the second planetary gearset
ST2 carrier of the second planetary gearset
PL2 planet gears of the second planetary gearset
RS3 third planetary gearset
HO3 ring gear of the third planetary gearset
SO3 sun gear of the third planetary gearset
ST3 carrier of the third planetary gearset
PL3 planet gears of the third planetary gearset
PS4 fourth planetary gearset
HO4 ring gear of the fourth planetary gearset
SO4 sun gear of the fourth planetary gearset
ST4 carrier of the fourth planetary gearset
PL4 planet gears of the fourth planetary gearset
i ratio
φ Gear stage spread (ratio difference)

Claimed is:

1. A multi-speed automatic transmission for a motor vehicle of a planetary design, the transmission comprising:
   an input shaft (AN);
   an output shaft (AB);
   first, second, third and fourth planetary gearsets (RS1, RS2, RS3, RS4), and each of the first, the second, the third and the fourth planetary gearsets (RS1, RS2, RS3, RS4) comprising a sun gear, a carrier and a ring gear;
   at least first, second, third, fourth, fifth, sixth, seventh and eighth rotatable shafts (1, 2, 3, 4, 5, 6, 7, 8) and first, second, third, fourth and fifth shifting elements (A, B, C, D, E) whose selective engagement creates different gear ratios between the input shaft (AN) and the output shaft (AB) so that eight forward gears and at least one reverse gear can be implemented;
   wherein the carrier (ST4) of the fourth planetary gearset (RS4) and the input drive shaft (AN) are permanently connected and form the first shaft (1);
   the carrier (ST2) of the second planetary gearset (RS2) and the carrier (ST3) of the third planetary gearset (RS3) and the output drive shaft (AB) are permanently connected and form the second shaft (2);
   the sun gear (SO1) of the first planetary gearset (RS1) and the sun gear (SO4) of the fourth planetary gearset (RS4) are permanently connected and form the third shaft (3);
   the carrier (ST1) of the first planetary gearset (RS1) forms the fourth shaft (4);
   the sun gear (SO3) of the third planetary gearset (RS3) forms the fifth shaft (5);
   the ring gear (HO1) of the first planetary gearset (RS1) and the ring gear (HO3) of the third planetary gear (RS3) are permanently connected and form the sixth shaft (6);
   the sun gear (SO2) of the second planetary gearset (RS2) and the ring gear (HO4) of the fourth planetary gearset (RS4) are permanently connected and form the seventh shaft (7);
   the ring gear (HO2) of the second planetary gearset (RS2) forms the eighth shaft (8);
   the first shifting element (A) is arranged between the third shaft (3) and a housing (GG) of the transmission;
   the second shifting element (B) is arranged between the fourth shaft (4) and the housing (GG) of the transmission;
   the third shifting element (C) is arranged, in a direction of power flow, between the first shaft (1) and the fifth shaft (5);
   the fourth shifting element (D) is arranged, in the direction of power flow, between the fifth shaft (5) and the eighth shaft (8); and the fifth shifting element (E) is arranged, in the direction of power flow, between the fifth shaft (5) and the seventh shaft (7).

2. The multi-speed transmission according to claim 1, wherein:
   a first forward gear is achieved by engagement of the first shifting element (A), the second shifting element (B) and the third shifting element (C);
   a second forward gear is achieved by engagement of the first shifting element (A), the second shifting element (B), and the fifth shifting element (E);
   the third forward gear is achieved by engagement of the second shifting element (B), the third shifting element (C) and the fifth shifting element (E);
   a fourth forward gear is achieved by engagement of the second shifting element (B), the fourth shifting element (D) and the fifth shifting element (E);
   a fifth forward gear is achieved by engagement of the second shifting element (B), the third shifting element (C) and the fourth shifting element (D);
   a sixth forward gear is achieved by engagement of the third shifting element (C) the fourth shifting element (D) and the fifth shifting element (F);
   a seventh forward gear is achieved by engagement of the first shifting element (A), the third shifting element (C) and the fourth shifting element (D);
   a eighth forward gear is achieved by engagement of the first shifting element (A), the fourth shifting element (D) and the fifth shifting element (E); and
   a reverse gear is achieved by engagement of the first shifting element (A), the second shifting element (B) and the fourth shifting element (D).

3. The multi-speed transmission according to claim 1, wherein the second planetary gearset (RS2), the third planetary gearset (RS3) and the fourth planetary gearset (RS4) are all negative planetary gearsets, and the first planetary gearset (RS1) is a positive planetary gearset.

4. The multi-speed transmission according to claim 1, wherein the first planetary gearset (RS1), the second planetary gearset (RS2), the third planetary gearset (RS3) and the fourth planetary gearset (RS4) are co-axial and arranged, in an axial direction, in a sequential order of:
   the first planetary gearset (RS1), the fourth planetary gearset (RS4), the second planetary gearset (RS2), and the third planetary gearset (RS3).

5. The multi-speed transmission according to claim 1, wherein the input shaft (AN) is one of axially parallel and at an angle to the output shaft (AD), and one of the first planetary gearset (RS1) and the third planetary gearset (RS3) is located on a side of the transmission housing (GG) closest to a drive motor which is connected to the input shaft (AN) of the transmission.

6. The multi-speed transmission according to claim 1, wherein the input shaft (AN) is co-axial with the output shaft (AR), and the first planetary gearset (RS1) is located on a side of the transmission housing (GG) closest a drive motor which is connected to the input shaft (AN).

7. The multi-speed transmission according to claim 1, wherein each of the first planetary gearset (RS1), the second planetary gearset (RS2), the third planetary gearset (RS3) and the fourth planetary gearset (RS4) are respectively radially centrally passed through, in an axial direction, by a maximum of one of the input shaft (AN), the output shaft (AD), the first shaft (1), the second shaft (2), the third shaft (3), the fourth shaft (4), the fifth shaft (5), the sixth shaft (6), the seventh shaft (7) and the eighth shaft (8).

8. The multi-speed transmission according to claim 1, wherein the first planetary gearset (RS1) and the fourth planetary gearset (RS4) are centrally passed through by only the first shaft (1) in an axial direction and the second planetary gearset (RS2) is centrally passed through, in the axial direction, by only the fifth shaft (5).

9. The multi-speed transmission according to claim 1, wherein neither the first planetary gearset (RS1) and the fourth planetary gearset (RS4) is centrally passed through by any of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) in the transmission, the second planetary gearset (RS2) is axially, centrally passed through by both the fifth shaft (5) and the first shaft (1), and the third planetary gearset (RS3) is axially, centrally passed through by only the first shaft (1).

10. The multi-speed transmission according to claim 1, wherein the third shaft (3) is rotatably connected to a hub which is connectable to the transmission housing (GG).

11. The multi-speed transmission according to claim 1, wherein at least one of the first shifting element (A) and the second shifting element (B) is radially located at least partially above one of the first planetary gearset (RS1) and the fourth planetary gearset (RS4).

12. The multi-speed transmission according to claim 1, wherein the first shifting element (A) is adjacent the second shifting element (B) and at least one friction element of the second shifting element (B) is located closer to the fourth planetary gearset (RS4) than a friction element of the first shifting element (A).

13. The multi-speed transmission according to claim 1, wherein one of the first shifting element (A) is radially located above the second shifting element (B) and the second shifting element (B) is radially located above the first shifting element (A).

14. The multi-speed transmission according to claim 1, wherein the third shifting element (C) is axially located at least partially between the fourth planetary gearset (RS4) and the second planetary gearset (RS2).

15. The multi-speed transmission according to claim 1, wherein the third shifting element (C) is directly axially adjacent the fourth planetary gearset (RS4).

16. The multi-speed transmission according to claim 1, wherein the fifth shifting element (E) is axially located at least partially between the fourth planetary gearset (RS4) and the second planetary gearset (RS2).

17. The multi-speed transmission according to claim 1, wherein the fifth shifting element (E) is axially adjacent the second planetary gearset (RS2).

18. The multi-speed transmission according to claim 1, wherein the third shifting element (C) is adjacent the fifth shifting element (E), and a disk set of the third shifting element (C) is located closer to the fourth planetary gearset (RS4) than a disk set of the fifth shifting element (E).

19. The multi-speed transmission according to claim 1, wherein the third shifting element (C) and the fifth shifting element (E) are located at least partially located one above another, and a disk set of the fifth shifting element (E) is radially located at least partially above a disk set of the third shifting element (C).

20. The multi-speed transmission according to claim 1, wherein the third shifting element (C) and the fifth shifting element (E) have a common disk carrier, which is fixed to the sun gear (SO3) of the third planetary gearset (RS3).

21. The multi-speed transmission according to claim 1, wherein the fourth shifting element (D) is axially located at least partially between the second planetary gearset (RS2) and the third planetary gearset (RS3).

22. The multi-speed transmission according to claim 1, wherein the fourth shifting element (D) is directly adjacent the second planetary gearset (RS2).

23. The multi-speed transmission according to claim 1, wherein the sixth shaft (6) completely overlies, in an axial direction, the fourth planetary gearset (RS4), the second planetary gearset (RS2), the third shifting element (C), the fifth shifting element (E) and the fourth shifting element (D).

24. The multi-speed transmission according to claim 1, wherein at least one one-way clutch is located between at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) and the transmission housing (GG).

25. The multi-speed transmission according to claim 1, wherein an input and an output of the transmission are provided on opposite sides of the housing (GG).

26. The multi-speed transmission according to claim 1, wherein an input and an output of the transmission are located on a common side of the housing (GG).

27. The multi-speed transmission according to claim 1, wherein at least one of an axle differential and a distributor differential is located on one of the input shaft (1) and the output shaft (2).

28. The multi-speed transmission according to claim 1, wherein a coupling element is located, in the direction of the power flow, between a drive motor and the input shaft (AN).

29. The multi-speed transmission according to claim 28, the coupling element is one of a hydrodynamic converter, a hydraulic clutch, a dry starting clutch, a wet starting clutch, a magnetic-power clutch and a centrifugal clutch.

30. The multi-speed transmission according to claim 1, wherein the vehicle is started via one of the first shifting element (A), the second shifting element (B), the third shifting element (C) and the fourth shifting element (D), and the input shaft (AN) is permanently connected to a crankshaft of a drive motor in one of a rotationally fixed manner and a rotationally elastic manner.

31. The multi-speed transmission according to claim 1, wherein the vehicle is started in at least one of a forward direction and a reverse direction via one of the first shifting element (A) and the second shifting element (B).

32. The multi-speed transmission according to claim 1, wherein one of a wear free brake, a power take-off for driving additional units, an electric machine is fixed to at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) of the transmission, and the electric machine is at least one of a generator and an additional drive unit.

33. The multi-speed transmission according to claim 1, wherein each of the first shifting element (A), the second shifting element (B) ,the third shifting element (C), the fourth shifting element (D) and the fifth shifting element (E) is one of a friction-locking clutch, a friction-locking brake, a disc clutch, a band brake and a conical clutch, a form-fit clutch, a form-fit brake, a conical clutch and a claw clutch.

* * * * *